Jan. 10, 1961 P. B. STRONG 2,967,371
FISH HOOK
Filed Nov. 21, 1958

INVENTOR
Paul B. Strong

BY

ATTORNEY

United States Patent Office 2,967,371
Patented Jan. 10, 1961

2,967,371

FISH HOOK

Paul B. Strong, 6005 Preston Road, Dallas, Tex.

Filed Nov. 21, 1958, Ser. No. 775,475

1 Claim. (Cl. 43—42.74)

This invention relates to fish hook suspension means, and it concerns more particularly, in combination with a pair of fish hooks, suspension means connecting the hooks to a fishing line.

An object of the invention is to provide, in combination with a pair of fish hooks, suspension means connecting the eyes of the hooks to a fishing line and supporting the hooks intermediate their ends whereby the hooks extend outwardly in opposite directions from their connected ends and lie substantially in a common plane.

Another object of the invention is to provide, in combination with a pair of fish hooks, suspension means including a link connecting the eyes of the hooks to a fishing line and means coacting with the link to support the hooks intermediate their ends whereby the hooks extend outwardly in opposite directions from their connected ends and lie substantially in a common plane which is perpendicular to the link.

Another object of the invention is to provide, in combination with a pair of fish hooks, suspension means including a link pivotally connecting the eyes of the hooks to a fishing line and means coacting with the link to yieldably support the hooks intermediate their ends whereby the hooks normally extend outwardly in opposite directions from their connected ends and lie substantially in a common plane which is perpendicular to the link.

A further object of the invention is to provide, in combination with a pair of fish hooks, suspension means including a link pivotally connecting the eyes of the hooks to a fishing line, a tubular body, open at its lower end, surrounding the link, the body having an opening in its upper end for the link and a pair of diametrically opposed notches in its lower edge, means above and below the opening limiting longitudinal movement of the body relative to the link, the eyes of the hooks being pivotally connected to the link within the body, and a spring acting upon the hooks intermediate their ends whereby the hooks are yieldably urged outwardly and upwardly in engagement with the notches.

A further object of the invention is to provide, in combination with a pair of fish hooks, suspension means including a link pivotally connecting the eyes of the hooks to a fishing line, a tubular body, open at its lower end, the body having an opening in its upper end for the link and a pair of diametrically opposed V-shaped notches in its lower edge, the link consisting of a piece of wire which is passed through the opening in the body and has a loop formed therein above the opening for use as an eye to connect it to a fishing line, and forming an abutment for engagement by the body to limit upward movement thereof relative to the link, the link having a substantially rectangular loop formed therein below the opening for engagement by the inner wall of the body to align the body with the link, and forming an abutment for engagement by the body to limit downward movement thereof relative to the link, the eyes of the hooks being pivotally connected to a transverse portion of the last mentioned loop and a coil spring looped about the transverse portion and having its ends connected to the hooks intermediate their ends whereby the hooks are yieldably urged outwardly and upwardly in engagement with the notches.

The invention will be readily understood by referring to the following description and the accompanying drawing, in which.

Figure 1:
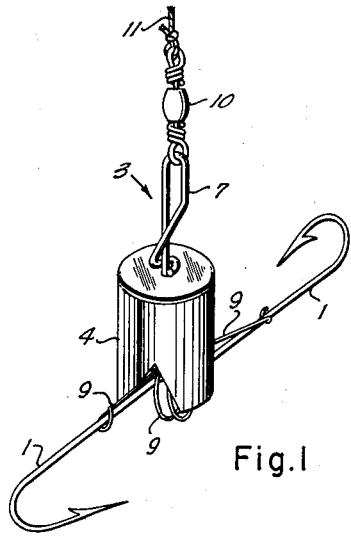
Fig. 1 is a perspective view of fish hook suspension means embodying the invention.
Figure 2:
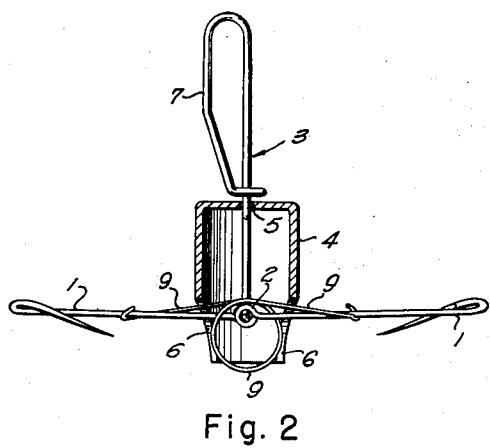
Fig. 2 is a sectional elevational view, taken on a median line, showing the hooks in one of their operating positions.
Figure 4:
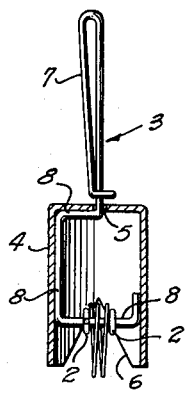
Fig. 4 is a sectional elevational view taken at right angles to the view shown in Fig. w.
Figure 3:
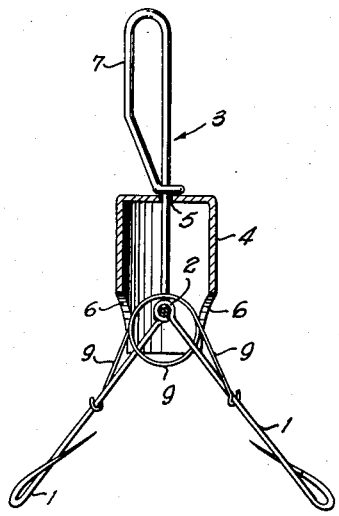
Fig. 3 is a view similar to Fig. 2, showing the hooks in another of their operating positions.

Referring to the embodiment of the invention shown in Figs. 1 to 4 of the drawing, a pair of fish hooks are designated by the numerals 1. Each of the hooks 1 has an eye 2, which is pivotally connected to a link 3 as hereinafter described. A tubular body 4, open at its lower end, surrounds the link 3. The body 4 has an opening 5 in its upper end for the link 3 and a pair of diametrically opposed notches 6 in its lower edge.

The link 3 consists of a piece of wire which is passed through the opening 5 and has a loop 7 formed therein above the opening 5 for use as an eye to connect it to a fishing line, and forming an abutment for engagement by the body 4 to limit upward movement thereof relative to the link 3. The link 3 has a substantially rectangular loop 8 formed therein below the opening 5 for engagement by the inner wall of the body 4 to align the body 4 with the link 3, and forming an abutment for engagement by the body 4 to limit downward movement thereof relative to the link 3.

The eyes 2 of the hooks 1 are pivotally connected to a transverse portion of the loop 8. A coil spring 9 is looped about the transverse portion and has its ends connected to the hooks 1 intermediate their ends whereby the hooks 1 are yieldably urged outwardly and upwardly in engagement with the notches 6. The notches 6 are V-shaped.

The position of the ends of the spring 9 relative to the hooks 1 is such that a minnow impaled upon one of the hooks 1 is prevented from advancing along the shank of the hook in the direction of its connected end by the presence of the spring.

As shown in Fig. 1, one end of the link 3 is connected to a swivel 10, which in turn is connected to a fishing line 11. The opposite end of the link 3 is pivotally connected to the eyes 2 of the hooks 1, as above described.

The hooks 1 are yieldably supported intermediate their ends, in the manner described, whereby they normally extend outwardly in opposite directions from their connected ends and lie substantially in a common plane which is perpendicular to the link 3.

Figure 5:
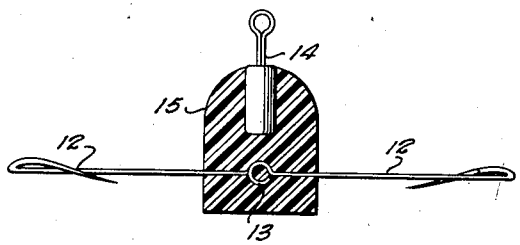
Fig. 5 is a sectional elevational view, taken on a median line, of a modified form of the invention.

Referring to the modified form of the invention shown in Fig. 5, a pair of hooks 12, which correspond to the hooks 1 shown in Figs. 1 to 4, have eyes 13 which are pivotally connected to one end of a link comprising a swivel 14, which is connected at its opposite end to a fishing line (not shown). The adjacent portions of the hooks 12 and the swivel 14 are embedded in a molded body 15, which advantageously may be formed of plastic material, whereby the hooks 12 are supported intermediate their ends. The hooks 12 extend outwardly in opposite directions and lie substantially in a common plane which is perpendicular to the link comprising the swivel 14.

The invention may be modified in various ways without departing from the spirit and scope thereof.

What is claimed is:

The combination of a pair of fish hooks each having an eye, a link consisting of a piece of wire having loops in opposite ends thereof, one of the loops being adapted to be connected to a fishing line, whereby the link is suspended from the line, and the other loop being passed through the eyes of the hooks whereby the hooks are pivotally connected thereto, a tubular body, open at its lower end, surrounding the link and positioned below the first mentioned loop, the body having an opening in its upper end for receiving the link and having a pair of diametrically opposed notches in its lower edge, the first mentioned loop forming an abutment for engagement by the body to limit upward movement thereof relative to the link and the last mentioned loop forming an abutment for engagement by the body to limit downward movement thereof relative to the link, the last mentioned loop having a generally rectangular outline conforming in configuration to the inner wall of the body, whereby the body is aligned axially with an intermediate portion of the link, and having a transversely extending portion positioned immediately below and between the bottoms of the notches, the eyes of the hooks being pivotally connected to the transversely extending portion of the last mentioned loop, and a coil spring looped about the transversely extending portion and having its ends connected to the hooks intermediate their ends whereby the hooks are yieldably urged outwardly and upwardly, in engagement with the notches, and normally extend outwardly in opposite directions from their connected ends and lie substantially in a common plane which is perpendicular to the link.

References Cited in the file of this patent

UNITED STATES PATENTS

| | | |
|---|---|---|
| 610,098 | Sly | Aug. 30, 1898 |
| 1,812,906 | Swearingen | July 7, 1931 |
| 2,615,275 | DeMello | Oct. 28, 1952 |